(12) United States Patent
Zelmanov et al.

(10) Patent No.: US 6,705,679 B1
(45) Date of Patent: Mar. 16, 2004

(54) MULTI-POSITION LATCH APPARATUS AND METHOD

(75) Inventors: Dmitriy Zelmanov, Southfield, MI (US); David L. Robinson, Sterling Heights, MI (US)

(73) Assignee: Fisher Dynamics Corporation, St. Clair Shores, MI (US)

(*) Notice: Subject to any disclaimer, the term of this patent is extended or adjusted under 35 U.S.C. 154(b) by 0 days.

(21) Appl. No.: 10/236,795

(22) Filed: Sep. 6, 2002

(51) Int. Cl.$^7$ .................................................. B60N 2/02
(52) U.S. Cl. ............................ 297/378.13; 297/378.12; 296/65.16; 296/65.17
(58) Field of Search ....................... 297/378.13, 378.12; 296/65.16, 65.17

(56) References Cited

U.S. PATENT DOCUMENTS

| | | | |
|---|---|---|---|
| 4,067,611 A | * 1/1978 | Kurozu et al. | 297/378.13 |
| 4,068,890 A | * 1/1978 | Kurozu et al. | 297/378.13 |
| 5,713,634 A | * 2/1998 | Koike | 297/378.13 |
| 6,312,055 B1 | * 11/2001 | Uematsu | 297/378.13 |
| 6,547,302 B1 | * 4/2003 | Rubio et al. | 296/65.09 |

* cited by examiner

Primary Examiner—Laurie K. Cranmer
(74) Attorney, Agent, or Firm—Harness, Dickey & Pierce, P.L.C.

(57) ABSTRACT

A seat latch mechanism accommodating a plurality of seatback positions, comprising an upper housing and a lower housing whereby the lower housing includes a recess for a striker to pass therethrough when the latch mechanism is in an unlatched position. Further, a latch assembly is provided and is operably supported by the lower housing, whereby the latch assembly is operable between a latched position and an unlatched position, and an actuation assembly operably supported by the upper and lower housings and in operable communication with the latch assembly to selectively toggle the latch assembly between the latched and unlatched position.

42 Claims, 13 Drawing Sheets

MULTI-POSITION LATCH APPARATUS AND METHOD

FIELD OF THE INVENTION

The present invention relates to latch mechanisms and, more particularly, to an improved latch mechanism for a seat assembly.

BACKGROUND OF THE INVENTION

In automotive applications, it is increasingly desirable that a vehicle be capable of accommodating varying requirements, such as cargo carrying and the like. It is further desirable that a vehicle be capable of accommodating varying requirements with respect to occupant comfort. To that end, reconfiguration of the vehicle seating system plays a significant role.

Generally speaking, articulation of a seatback enables a vehicle interior to be configurable for accommodating cargo-carrying needs and to provide occupant comfort. Latching mechanisms are often used to selectively anchor a seatback to a stationary striker assembly, thereby securing the seatback to a vehicle structure. In such a system, a conventional latching mechanism cooperates with a striker to provide the seatback with one of either a latched position or an unlatched position. In the latched position the seatback is secured to the vehicle structure in a fixed relationship. In the unlatched position the seatback is free to be dumped forward or folded flat. Conventional latching mechanisms suffer from the disadvantage that they only allow for the seatback to be latched in a single position, thereby hampering occupant comfort.

In addition to limiting occupant comfort, conventional latch mechanisms cooperating with striker assemblies also limit the flexibility of a cargo area of a vehicle located behind a vehicle seat. Current seating systems accommodate large cargo by folding the seatback in a substantially fold-flat position such that the seatback is generally parallel to the seat bottom. In other known systems, the seatback is again folded flat, and together with the seat bottom, the seatback is articulated or dumped forward, thereby increasing the cargo area of the vehicle. Such systems, while adequately providing for increased cargo areas in a vehicle, do not provide for occupant use of a seat when increased cargo capacity is required.

One prior art latch system, as shown in FIGS. 1–3, provides a latch mechanism W cooperating with a plurality of strikers (not shown) to selectively position a seatback in a variety of positions relative to a seat bottom. The latch mechanism W provides a wheel X for receiving a striker and a cam Y to selectively lock the wheel X in one of a plurality of positions. An actuation handle Z is further provided to manipulate the cam Y between a locked and an unlocked position.

The wheel X of latch mechanism W receives a first striker which causes the wheel X to rotate about a central axis. Continued rotation of the wheel X will eventually cause the cam Y to engage the wheel X such that the wheel X is not permitted to rotate, thereby locking the wheel in a fixed position. In this manner, the seatback is latched in a predetermined position relative to the seat bottom due to the relationship of the first striker to the seatback. To position the seatback in a different position relative to the seat bottom, a force is applied to the actuation handle Z which causes the cam Y to disengage the wheel X and subsequently allows the wheel X to rotate. Sufficient rotation of the wheel X releases the first striker, thereby allowing the wheel X to receive a second striker and subsequently position the seatback in a different relationship relative to the seat bottom.

While this latch system adequately positions the seatback in a plurality of positions relative to the seat bottom, small variations between the striker and the latch mechanism components may allow the seatback to move a miniscule amount even when the mechanism is locked. These small variations become noticeable at the upper end of the seatback and can cause noise and discomfort to an occupant. For example, the seatback of an unoccupied seat may tend to vibrate when the vehicle encounters rough road conditions, thereby creating undesirable noise and rattling. This magnified play in a latch mechanism has been termed "chucking" and refers to any manufacturing variation or play in the mechanism components or between the mechanism components and a striker that allows movement of the seatback while the mechanism is in a latched condition.

Therefore a latch mechanism in cooperation with a striker assembly that provides for angular adjustment of a seatback in a plurality of positions relative to the seat bottom and securely latches a seat to a vehicle structure when in a latched position is desirable in the industry. Additionally, providing increased cargo-carrying capability in the cargo area of a vehicle while still maintaining use of the vehicle seat is also desirable. Further yet, it is desirable to provide a latch mechanism that significantly reduces or eliminates chucking of a seat assembly.

SUMMARY OF THE INVENTION

Accordingly, the present invention provides a seat latch mechanism including an upper housing and a lower housing. The lower housing includes a recess for a striker to pass therethrough when a latch assembly is in an unlatched position. The a latch assembly is operably supported by the lower housing and is operable between a latched position and an unlatched position. An actuation assembly is operably supported by the upper and lower housings and is pivotably attached to the latch assembly to selectively toggle the latch assembly between the latched and unlatched position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5b is a more detailed exploded view of particular components of FIG. 5a;

DETAILED DESCRIPTION OF THE PREFERRED EMBODIMENTS

The following description of the preferred embodiment is merely exemplary in nature and is in no way intended to limit the invention, its application, or uses.

Figure 1:
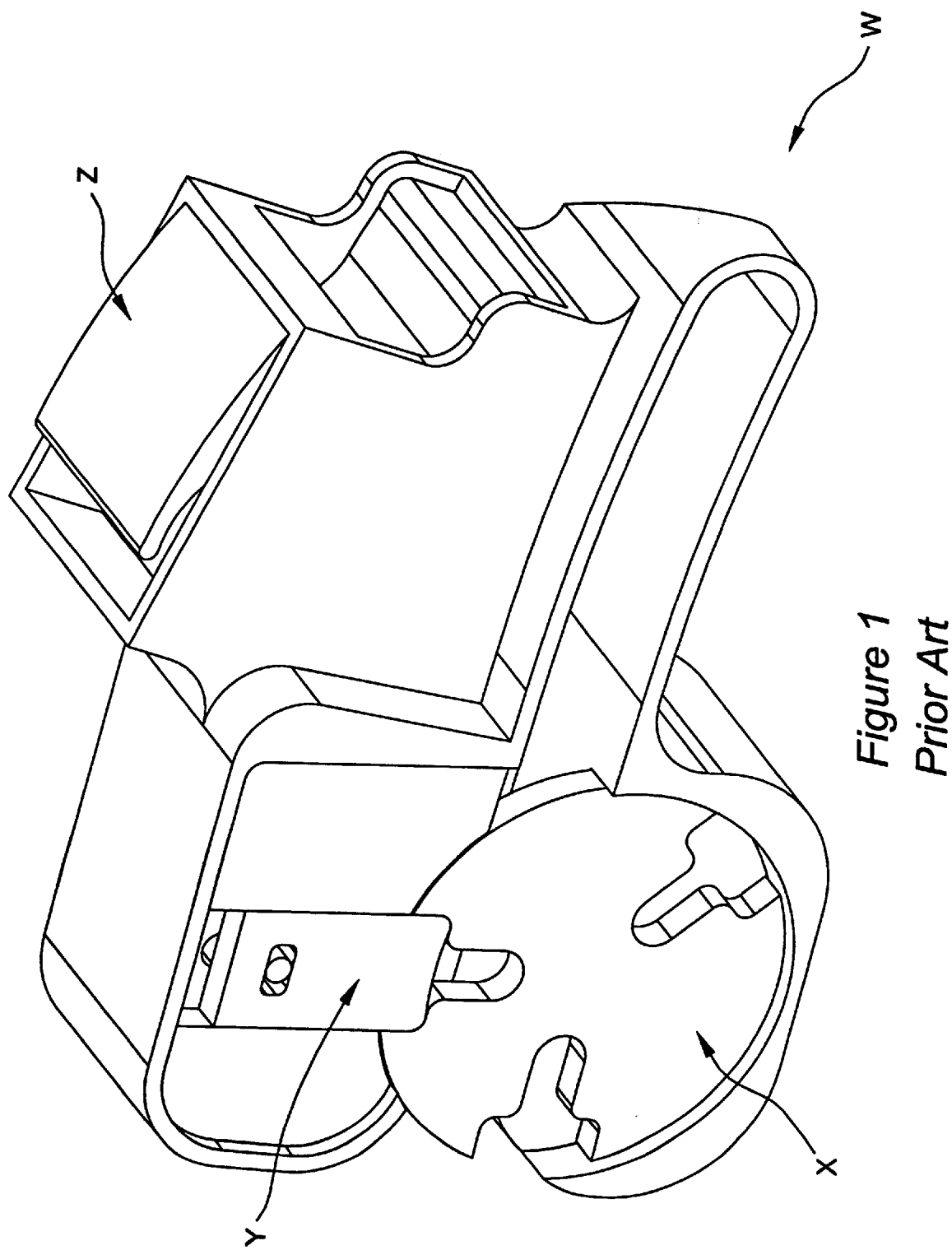
FIG. 1 is a perspective view of a prior art latch mechanism in a latched position.
Figure 2:
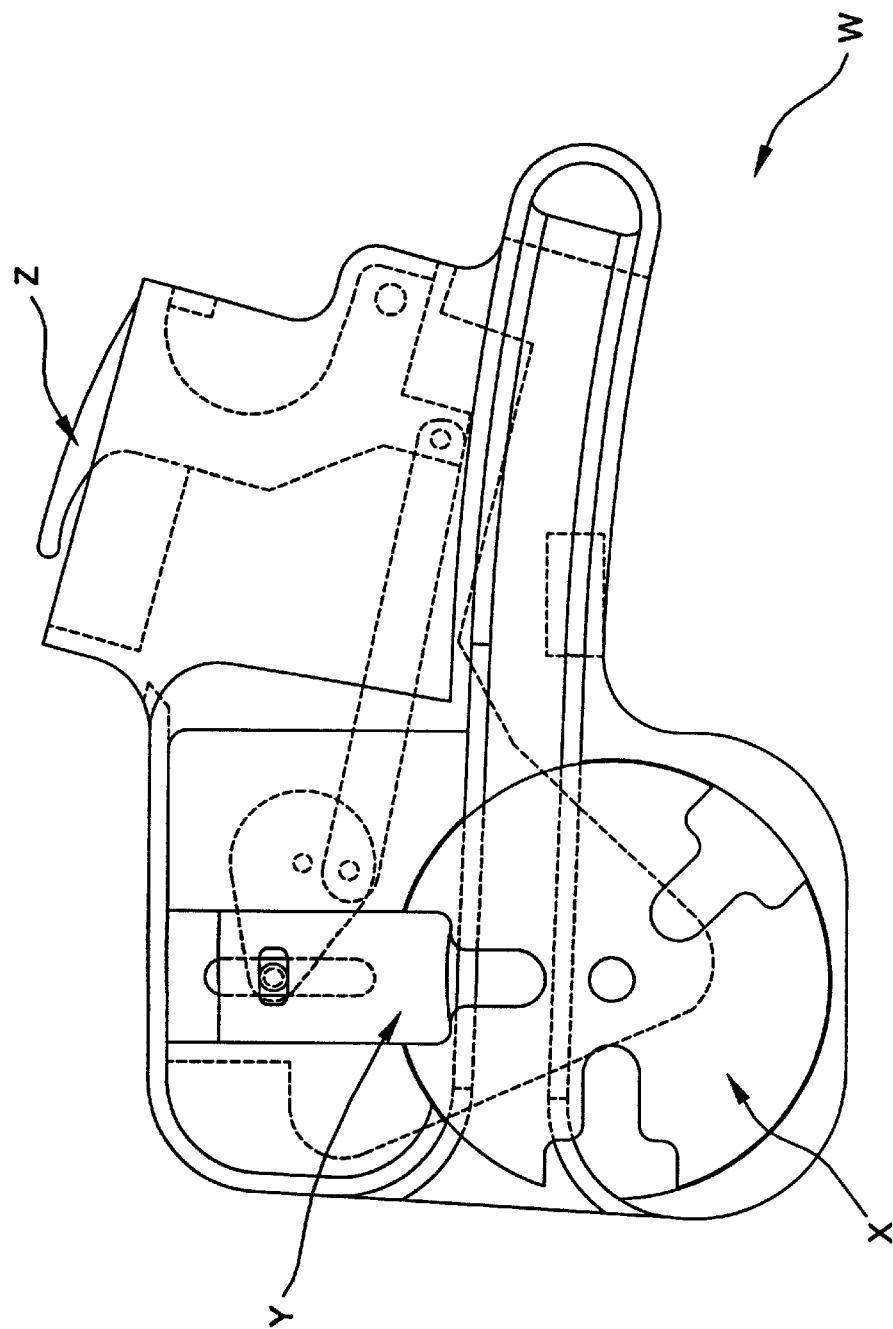
FIG. 2 is a side view of a prior art device with part of a housing removed to show the internal workings of the latch mechanism of FIG. 1 in the latched position.
Figure 3:
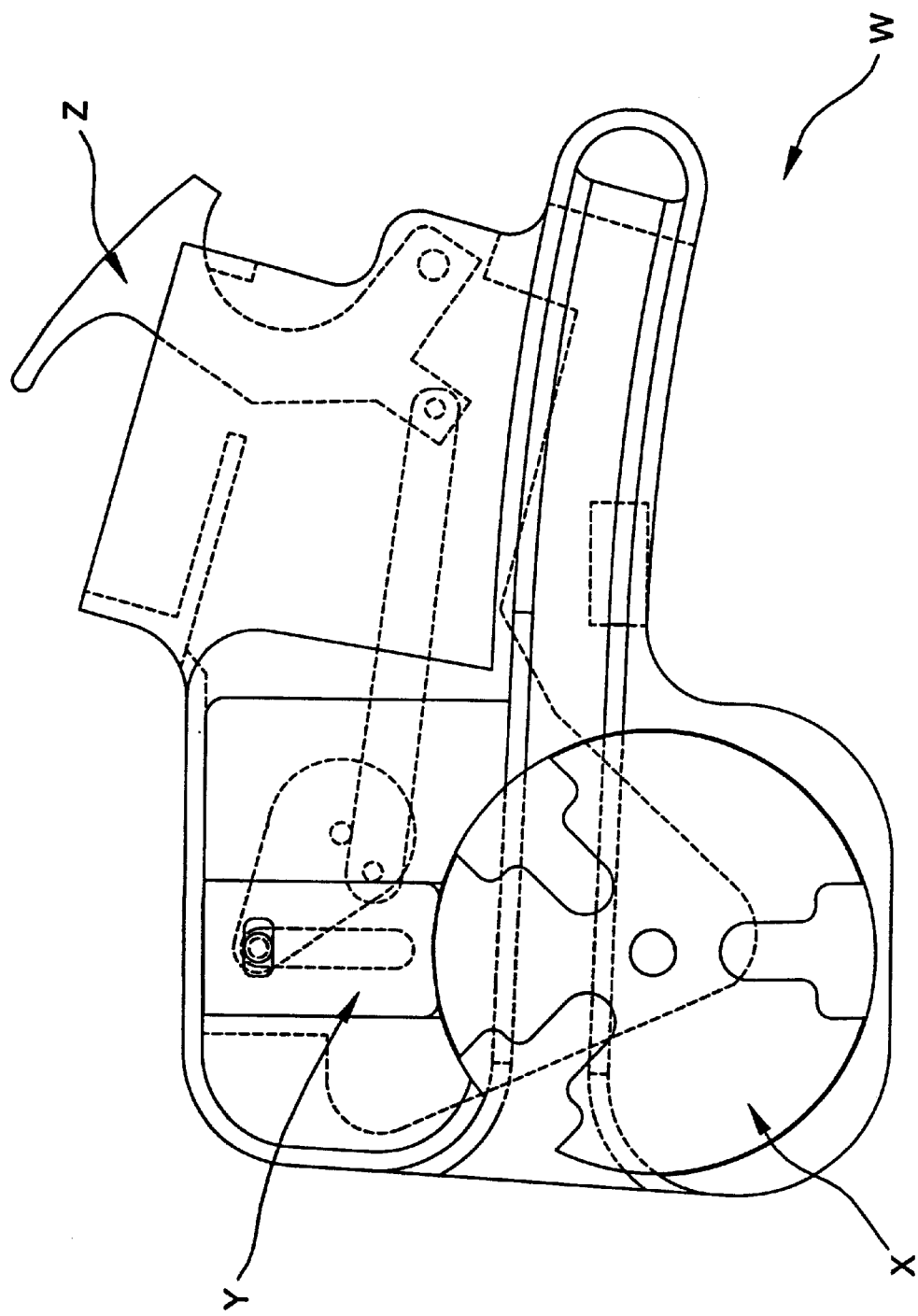
FIG. 3 is a side view of a prior art device with part of a housing removed to show the internal workings of the latch mechanism of FIG. 1 in the unlatched position.
Figure 4:
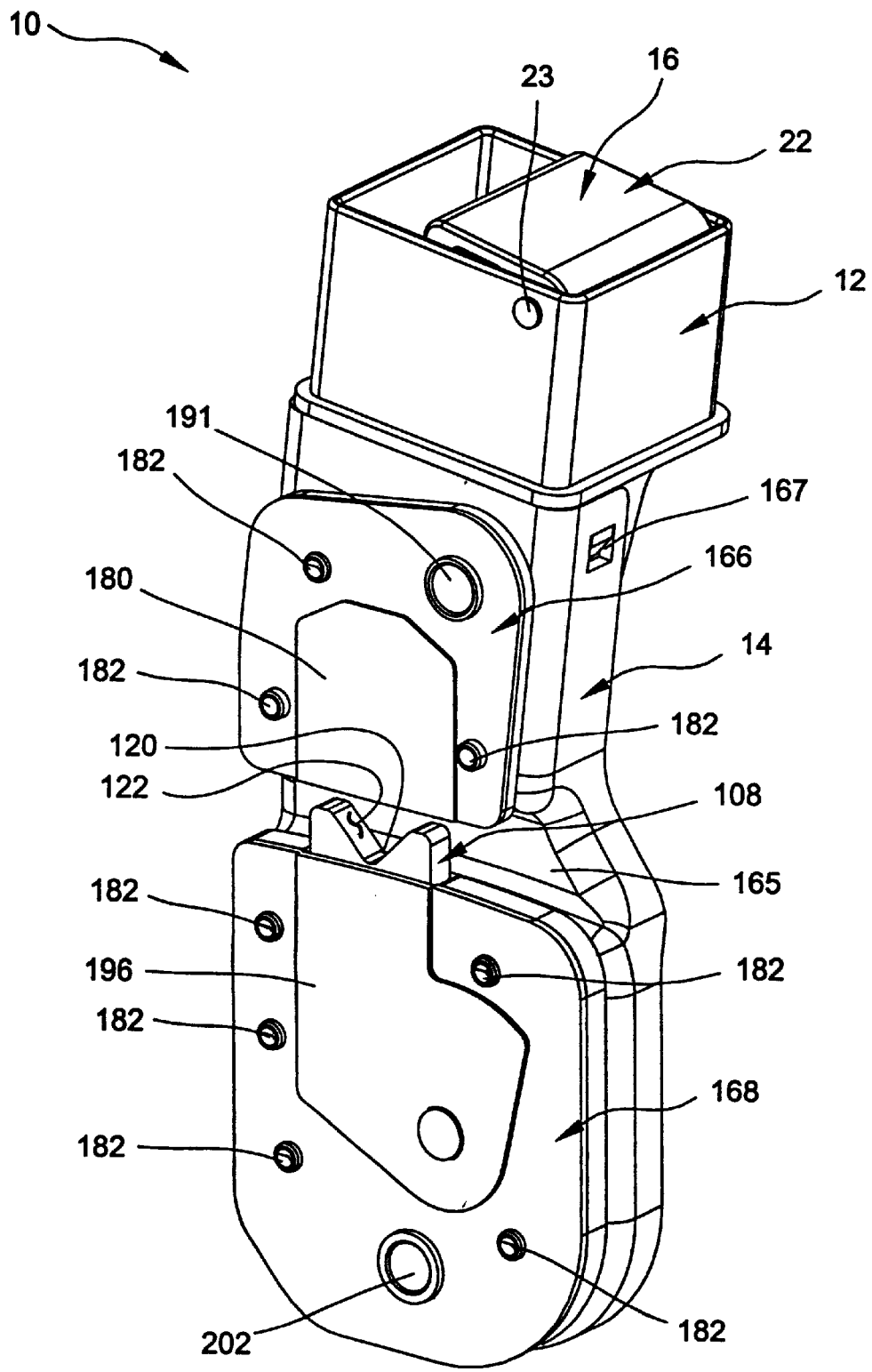
FIG. 4 is a perspective view of a latch mechanism in accordance with the principles of the present invention.
Figure 5A:
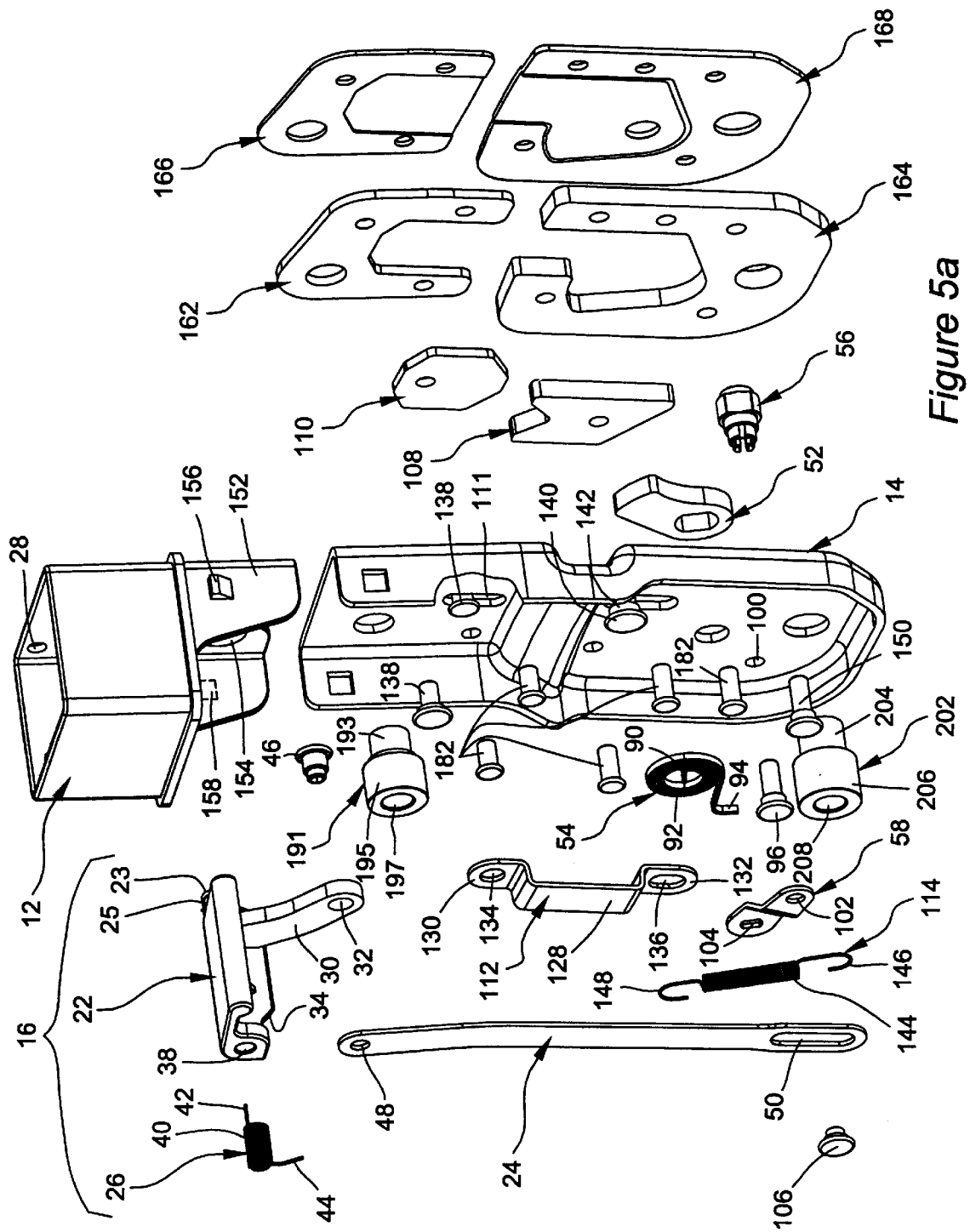
FIG. 5a is an exploded view of the latch mechanism of FIG. 4.
Figure 5B:
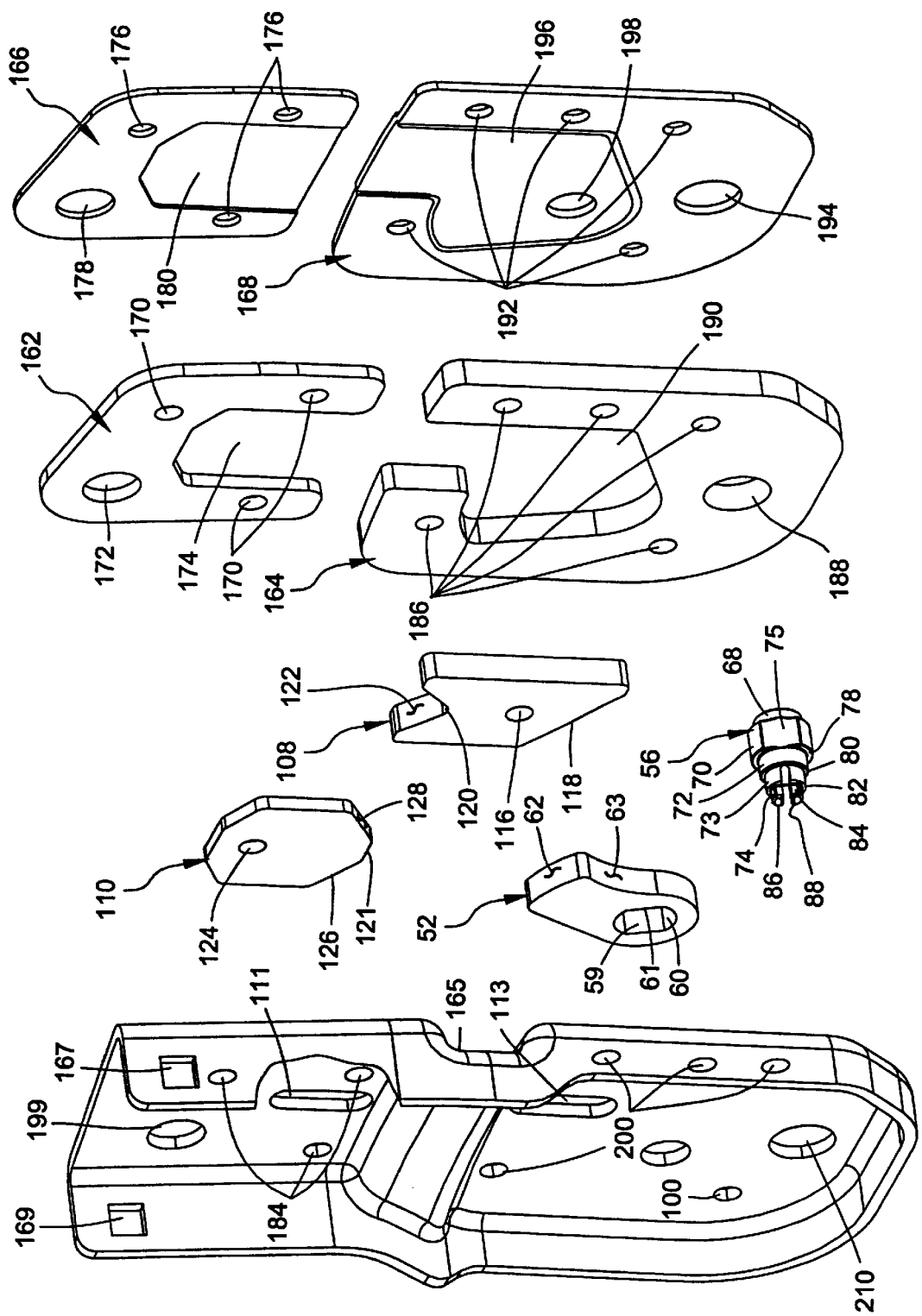

With reference to FIGS. 4, 5a and 5b, a latch mechanism 10 is provided an includes upper and lower housings 12,14, an actuation assembly 16, a cam assembly 18, and a latch assembly 20. The actuation assembly 16 is pivotably connected to the cam assembly 18 and is supported by the upper and lower housings 12,14. The cam assembly 18 selectively engages the latch assembly 20 and is supported by the lower housing 14.

Figure 6:
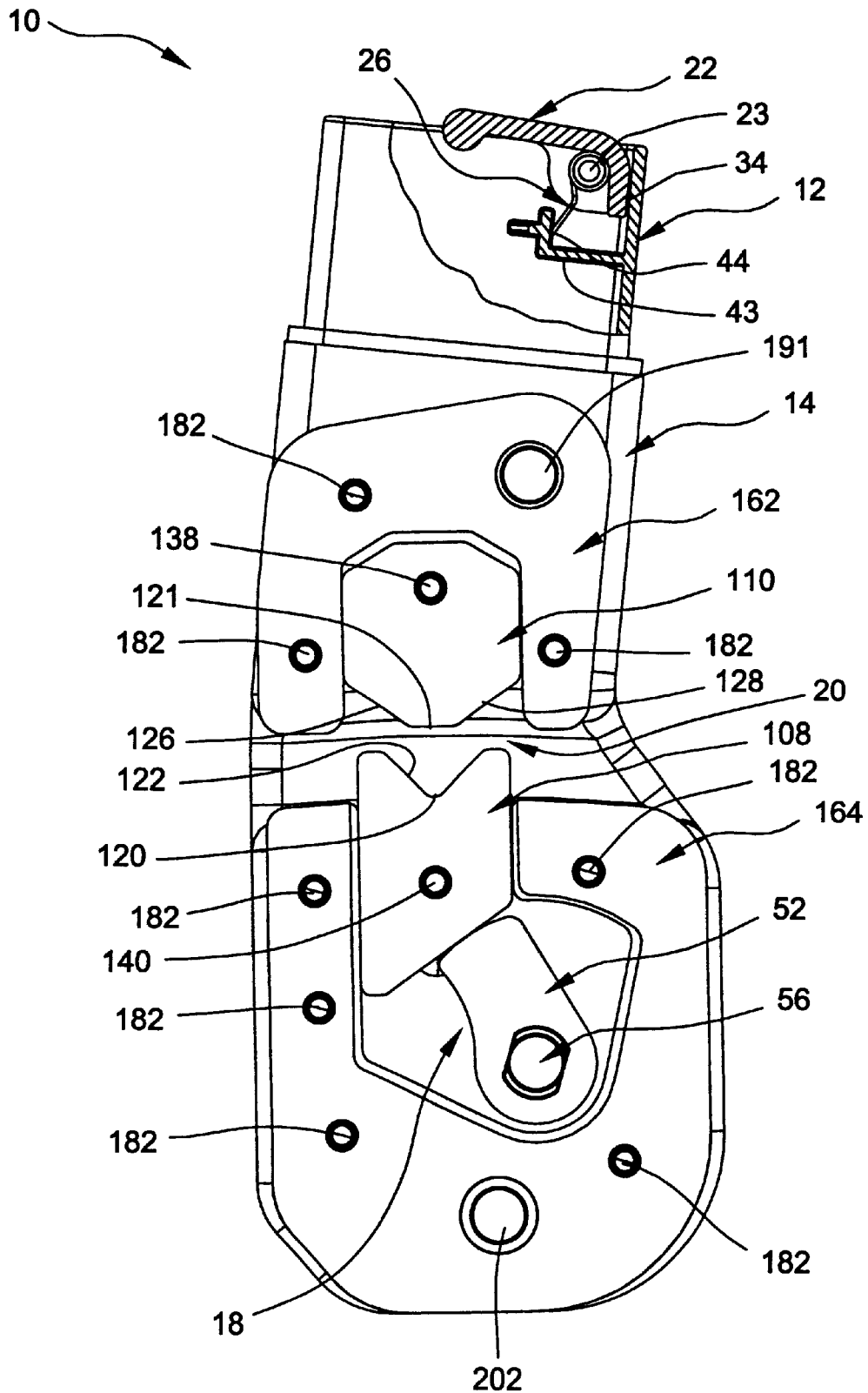
FIG. 6 is a plan view of the latch mechanism with part of a housing removed to show the internal workings of the latch mechanism in the latched position.

As shown in FIGS. 5a and 5b, the actuation assembly 16 includes an actuation handle 22, an actuation link 24, and a handle spring 26. The actuation handle 22 generally includes an attachment post 23, an extension 30, and a stop surface 34. The attachment post 23 includes a bearing surface 25 and is pivotably received through attachment aperture 28 of the upper housing 12. The extension 30 is disposed near the base of the attachment post 23 for interaction with the actuation link 24, which has an attachment aperture 32 formed therethrough. The handle spring 26 is received by the actuation handle 22 and includes a generally cylindrical coiled central member 40 flanked by first and second attachment posts 42,44. The handle spring 26 further engages an extension 43 of the upper housing 12 and serves to bias the actuation handle 22 in a first rotational direction. The stop surface 34 is disposed opposite the extension 30 and reacts against the upper housing 12 to restrict movement of the actuation handle 22 in the first rotational direction as best shown in FIG. 6.

The extension 30 is pivotably connected to the actuation link 24 by a rivet 46 inserted through attachment aperture 32 to allow for selective engagement of the cam assembly 18 as will be discussed further below. The actuation link 24 is an elongate member having an attachment aperture 48 at its proximal end for receiving the rivet 46 and a slot 50 at its distal end. The actuation link 24 extends generally from the base of the actuation handle 22 through the upper and lower housings 12,14 for interaction with the cam assembly 18. In this manner, the actuation handle 22 and cam assembly 18 are generally coaxially disposed with communication therebetween accomplished by movement of the actuation link 24. Coaxially disposing the actuation handle 22 and cam assembly provides for a generally streamlined construction and smaller assembly package for the upper and lower housings 12,14.

The cam assembly 18 generally includes a cam plate 52, a coil spring 54, a cam pivot 56, and a cam lever 58. The cam plate 52 is a generally flat member including a central attachment aperture 60 having flats 59,61 and first and second engagement faces 62,63 generally opposite the attachment aperture 60. The attachment aperture 60 receives the cam pivot 56 for rotatable attachment to the lower housing 12.

The cam pivot 56 is a generally cylindrical member having first, second, third, fourth, and fifth cylindrical sections 68,70,72,73,74. The second cylindrical section 70 includes diametrically opposed flats 75 (only one of which is shown) and is flanked by the first and second cylindrical sections 68,72. The second cylindrical section 70 has a larger diameter than that of the first and third cylindrical sections 68,72 and receives the attachment aperture 60 of the cam plate 52, whereby, the flats 75 matingly engage flats 59,61 of the cam plate 52 to prevent relative rotation therebetween. The difference in diameter between the second cylindrical section 70 and the third cylindrical section 72 forms a ridge 78 disposed therebetween.

The fourth cylindrical section 73 is disposed adjacent the third cylindrical section 70 and the fifth cylindrical section 74. The fourth cylindrical section 73 has a smaller diameter than that of the third cylindrical section 70 and a larger diameter than that of the fifth cylindrical section 74. The junction of the third cylindrical section 72 and the fourth cylindrical section 73 forms a ridge 80, while the junction between the fourth cylindrical section 73 and the fifth cylindrical section 74 forms a ridge 82. The fifth cylindrical section 74 further includes flats 84,86 for interaction with the cam lever 58 as will be discussed further below. The fourth and fifth cylindrical sections 73,74 include a groove 88 formed therethrough for interaction with the coil spring 54.

The coil spring 54 includes a central arm 90, a series of coils 92, and an extending arm 94. The central arm 90 is received into the groove 88 formed in the fourth cylindrical section 73 of the cam pivot 56 and the extending arm 94 seats against an anchor post 96 received through aperture 100 of the lower housing 14. The coil spring 54 biases the cam plate 52 in a first rotational direction and is supported by ridge 80 of the cam pivot 56.

The cam lever 58 interconnects the actuation assembly 16 and the cam assembly 18 and includes an aperture 102 at a first end and a slot 104 at a second end. Aperture 102 is rotatably attached to slot 50 of the actuation link 24 by a rivet 106, while slot 104 matingly receives flats 84,86 of the fifth cylindrical section 74 of the cam pivot 56 to prevent relative rotation thereof.

The latch assembly 20 is selectively unlatched by the engagement of the actuation assembly 16 with the cam assembly 18 as will be discussed further below. The latch assembly 20 includes a claw 108, a push-plate 110, a link 112, and a spring 114. The claw 108 is a generally flat member including an attachment aperture 116, a first engagement face 118, and a recess 120 having a first reaction surface 122. The push-plate 110 is a generally flat member having an attachment aperture 124 and a first, second, and third reaction surface 121,126,128.

The link 112 interconnects the claw 108 and the push-plate 110 and includes a generally flat central section 128 flanked by first and second feet 130,132. The first foot 130 includes an attachment aperture 134 for fixed attachment to the push-plate 110 and the second foot 132 includes a slot 136 for slidable attachment to the claw 108. A rivet 138 is received through attachment aperture 124 of the push-plate 110 to fixedly attach the push-plate 110 to the link 112 through attachment aperture 134 and is further slidably received by slot 111 of the lower housing 14. A rivet 140 having a spring post 142 is received through the attachment aperture 116 of the claw 108, slot 136 of link 128, and further by slot 113 of the lower housing 14 to slidably attach the claw 108 and the link 112 to the lower housing 14.

The spring 114 includes a generally cylindrical coiled central member 144 flanked by first and second attachment posts 146,148. The first attachment post 146 is attached to the spring post 150 of rivet 140 while the second attachment post 148 is attached to a spring post 142 disposed on the lower housing 14. The spring 114 biases the link 112, and subsequently the claw 108 and the push-plate 110, in a first direction.

The upper housing 12 includes an attachment flange 152 having an attachment aperture 154 formed therethrough and tabs 156,158 for interaction with the lower housing 14. The upper housing 12 further includes the attachment aperture 28 for rotatably receiving the attachment post 23 of the actuation handle 22 and fixedly receives the second attachment post 44 of the handle spring 26 at the extension 43 as previously discussed.

The lower housing 14 generally supports the upper housing 12, an upper guide plate 162, a lower guide plate 164, an upper outer plate 166, and a lower outer plate 168. The lower housing 14 further includes apertures 167,169 for mating engagement with tabs 156,158 of the upper housing 12 and further provides a recess 165 disposed between slot 111 and slot 113 extending laterally across the body of the lower housing 14.

The upper guide plate 162 includes attachment apertures 170, a bushing aperture 172, and a push-plate cutout 174. The upper outer plate 166 includes attachment apertures 176, a bushing aperture 178, and a push-plate recess 180. The upper guide plate 162 and upper outer plate 166 are fixedly attached to the lower housing 14 by rivets 182 received through attachment apertures 170,176 respectively and attachment apertures 184 of the lower housing 14. The upper guide plate 162 and upper outer plate 166 are further fixedly attached to the lower housing 14 through a bushing 191 having first and second cylindrical sections 193,195 and a bore 197 formed in bushing 191. The first cylindrical section 193 is received into bushing apertures 172,178 of the upper guide plate 162 and upper outer plate 166 respectively and through bushing aperture 199 of the lower housing 14.

The lower guide plate 164 includes attachment apertures 186, a bushing aperture 188, and a cam and claw cutout 190. The lower outer plate 168 includes attachment apertures 192, a bushing aperture 194, a cam and claw recess 196, and a cam pivot aperture 198. The lower guide plate 164 and lower outer plate 168 are fixedly attached to the lower housing 14 by rivets 182 received through attachment apertures 186,192 respectively and attachment apertures 200 of the lower housing 14. The lower guide plate 164 and lower outer plate 168 are further fixedly attached to the lower housing 14 through bushing 202 having first and second cylindrical sections 204,206 and a bore 208 formed in bushing 202. The first cylindrical section 204 is received into bushing apertures 188,194 of the lower guide plate 164 and lower outer plate 168 respectively and through bushing aperture 210 of the lower housing 14.

With particular reference to FIGS. 6–9, the operation of the latch mechanism 10 will be described in detail. In one embodiment, the latch mechanism 10 receives an external force applied to the latch assembly 20 to latch the latch mechanism 10 while the actuation assembly 16 interacts with the cam assembly 18 and the latch assembly 20 to selectively unlatch the latch mechanism 10 as will be described herein below.

Figure 7:
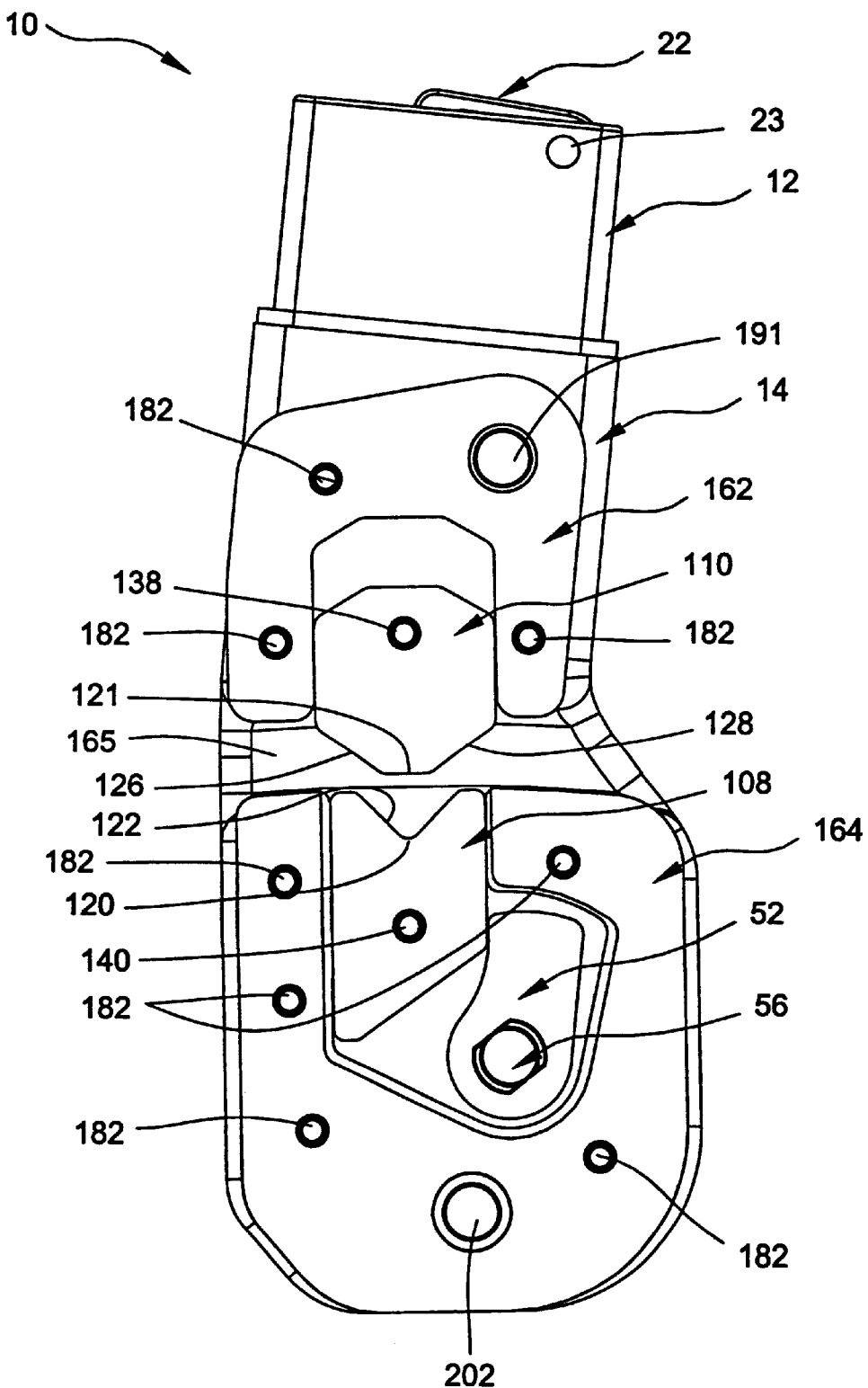
FIG. 7 is a plan view of the latch mechanism with part of a housing removed to show the internal workings of the latch mechanism in the unlatched position.

Applying a force to either reaction surface 126, 128 or 121 causes the push-plate 110 to move in a second direction as best shown in FIG. 6. Movement of the push-plate 110 in the second direction causes the claw 108 to move in the second direction due to the connection of the link 112 between the claw 108 and the push-plate 110. Movement of the push-plate 110 and claw 108 is guided by the push-plate cutout 174 of the upper guide plate 162 and by the claw cutout 190 of the lower guide plate 164 as well as by slots 111,113 of lower housing 14 as best shown in FIGS. 6 and 7. In addition, the push-plate recess 180 of the upper outer plate 166 and the claw recess 196 of the lower outer plate 168 further guide the claw 108 and the push-plate 110 in the first and second directions.

With continued movement of the claw 108 in the second direction, the second engagement face 63 of the cam plate 52 disengages the claw 108, thereby allowing the coil spring 54 to rotate the cam plate 52 in the first rotational direction. Once the claw 108 is sufficiently moved in the second direction, the first reaction surface 62 of the cam plate 52 engages the first engagement face 118 of the claw 108, thereby locking the cam plate 52, link 112, and push-plate 110 in the latched position.

Figure 8:
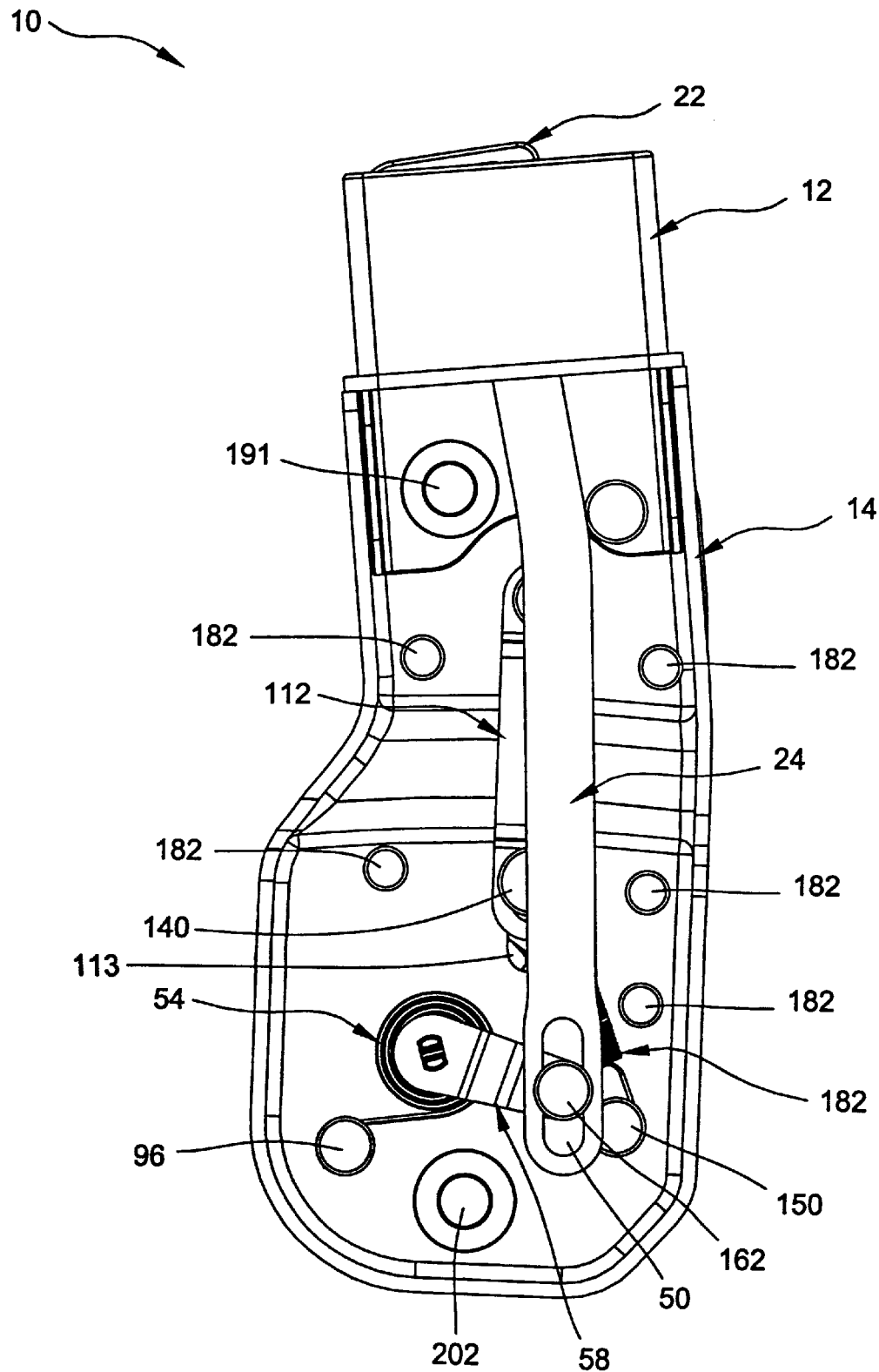
FIG. 8 is a plan view of the latch mechanism with part of a housing removed to show the internal workings of the latch mechanism in the latched position.
Figure 9:
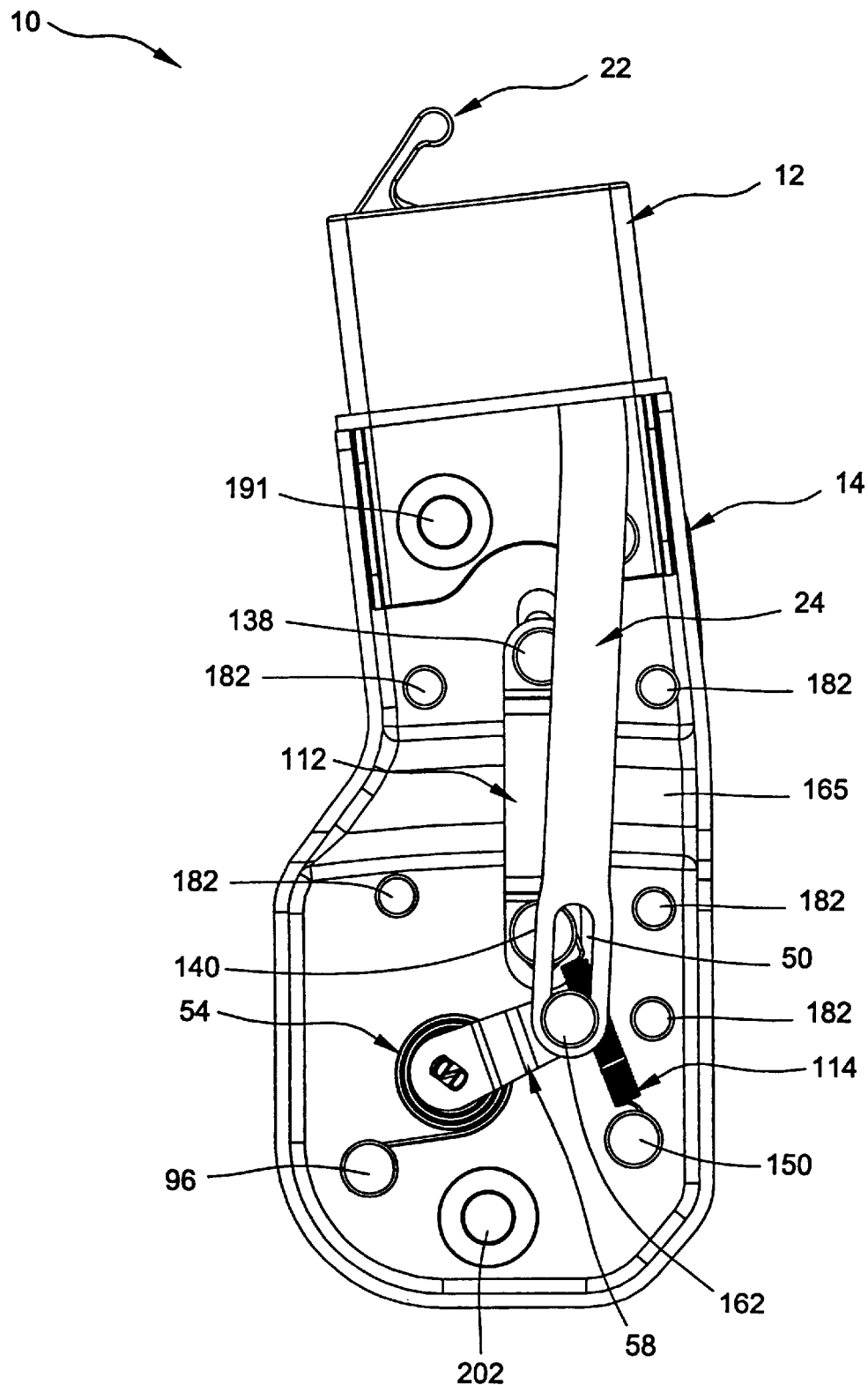
FIG. 9 is a plan view of the latch mechanism with part of a housing removed to show the internal workings of the latch mechanism in the unlatched position.

While the cam plate 52 is pivotably attached to the actuation assembly 18 via cam lever 58, movement of the cam plate 52 such that the first reaction surface 62 engages the first engagement face 118 of the claw 108, does not cause link 24 to move because the rivet 162 connecting cam lever 58 and link 24 is allowed to move along slot 50 as best shown in FIGS. 8 and 9.

To unlatch the latch mechanism 10, a force is applied to the actuation handle 22, thereby rotating the actuation handle 22 in a second rotational direction against the bias of handle spring 26. Rotation of the actuation handle 22 in the second rotational direction causes the extension 30 to rotate in the second rotational direction, thereby causing the link 24 to move in the second direction as shown in FIG. 9. Further rotation of the actuation handle 22 causes the link 24 to further move in the second direction and engage rivet 162, thereby rotating cam lever 58 in the second rotational direction. Rotation of cam lever 58 in the second rotational direction subsequently rotates the cam plate 52 in the second rotational direction against the bias of coil spring 54.

Continued rotation of the cam lever 58 and cam plate 52 in the second rotational direction causes the first engagement face 62 of the cam plate 52 to disengage the first engagement face 118 of the claw 108, thereby allowing spring 114 to move the claw 108, push-plate 110, and link 112 in the first direction. Once the claw 108 has moved sufficiently in the first direction, the actuation handle 22 may be released. Upon release of the actuation handle 22, the link 24 will move in the first direction, thereby allowing cam lever 58 to be rotated by the coil spring 54 in the first rotational direction. Rotation of cam lever 58 subsequently rotates the cam plate 52 in the first rotational direction until the second reaction surface 63 of the cam plate 52 once again engages the claw 108, thereby returning the latch mechanism 10 to the unlatched position.

Figure 10:
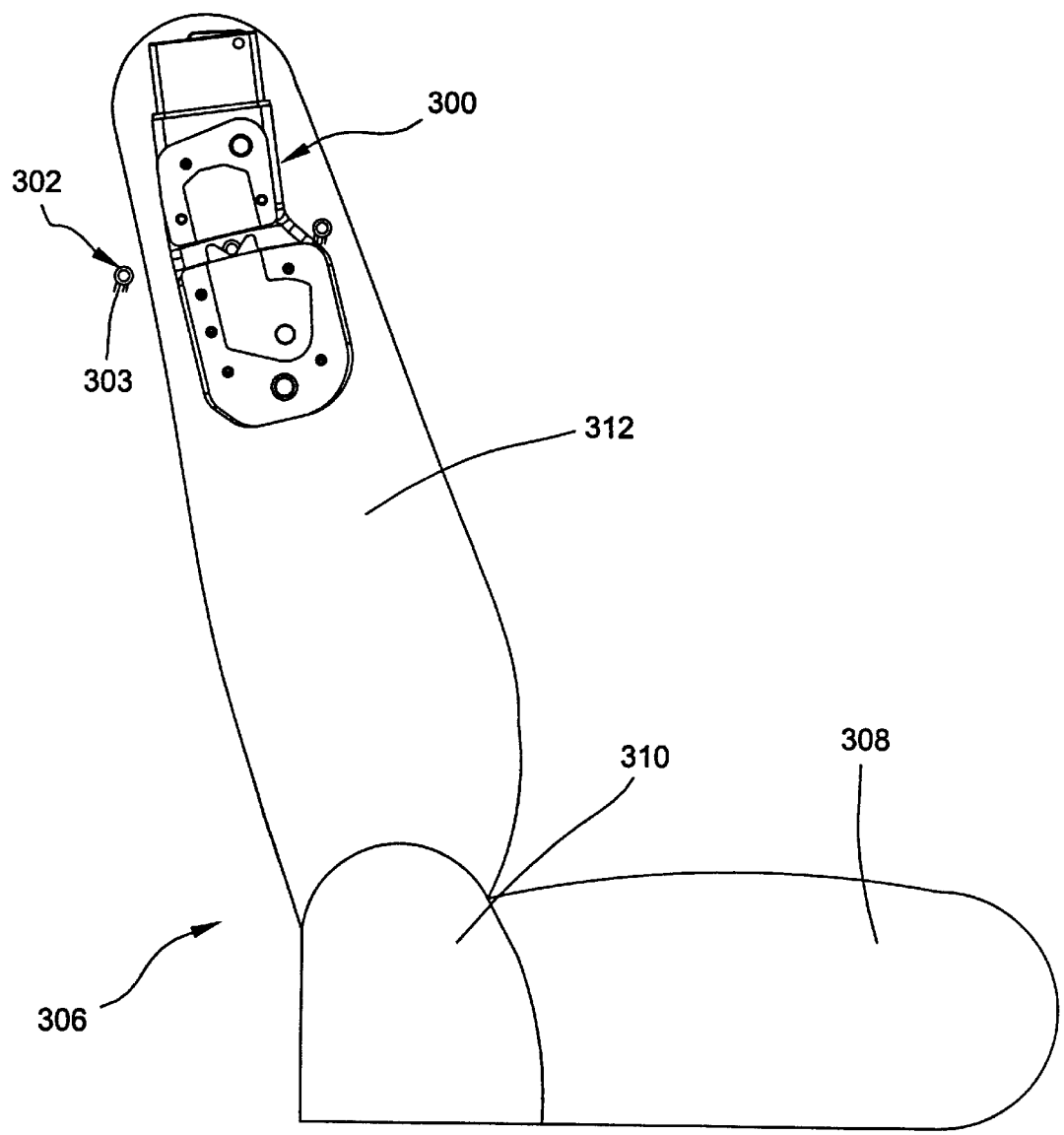
FIG. 10 is a side view of the latch mechanism in a seat assembly.

In one embodiment, the latch mechanism 10 is a seat latch assembly 300 cooperating with a plurality of T-shaped strikers 302 fixedly attached to a vehicle structure 303 to selectively latch the seat latch assembly 300 to one of the plurality of strikers 302 as best shown in FIG. 10. The plurality of strikers 302 are positioned radially on the vehicle structure 303 such that rotation of the seatback 312 about the seat pivot 310 will allow for mating engagement with the seat latch assembly 300 at different seatback angles. Further, the generally T-shape of the strikers 302 prohibits the claw 108 from sliding off the end of the striker 302 and further ensures that the striker 302 is held in engagement with the claw 108. With particular reference to FIG. 10, a seat 306 is provided having a seat bottom 308, a seat pivot 310, and a seatback 312 having the seat latch assembly 300 mounted thereto. The seat latch assembly 300 provides a means to selectively attach the seatback 312 to the vehicle structure 303.

As the seatback 312 is rotated in a first rotational direction, the seatback approaches one of the plurality of strikers 302, the recess 165 of the lower housing 14 is aligned such that the recess receives the striker. Once the striker is received in the recess 165, further movement of the seatback 312 causes the striker to engage engagement face 126 of push-plate 110. Engagement of one of the strikers and the push-plate 110 subjects the push-plate 110 to a force causing the push-plate 110 to move in the second direction. As previously described, movement of the push-plate 110 in the second direction causes the claw 108 to also move in the second direction.

Movement of the claw 108 in the second direction causes the reaction surface 122 of recess 120 to engage the striker 302 thereby locking the striker 302 between the recess 120 of the claw 108 and reaction surface 121 of the push-plate 110. At this point, the seat latch assembly 300 is in the latched position and the seatback 312 is fixed to the vehicle structure 303.

To unlatch the striker from the seat latch assembly 300, a force is again applied to the actuation handle 22 rotating the actuation handle 22 in the second rotational direction against the bias of handle spring 26 as described above, causing the link 24 to allow rotation of the cam plate 52 and subsequently causing the claw 108 to move in the first direction due to the bias of spring 114 and releasing the striker from engagement with recess 120 of the claw 108. In this position the seat latch assembly 300 is in the unlatched position. Continued rotation of the seatback 312 in the first rotational direction causes the striker to pass through the lower housing 14 and approach another one of the plurality of strikers 302.

Figure 14:
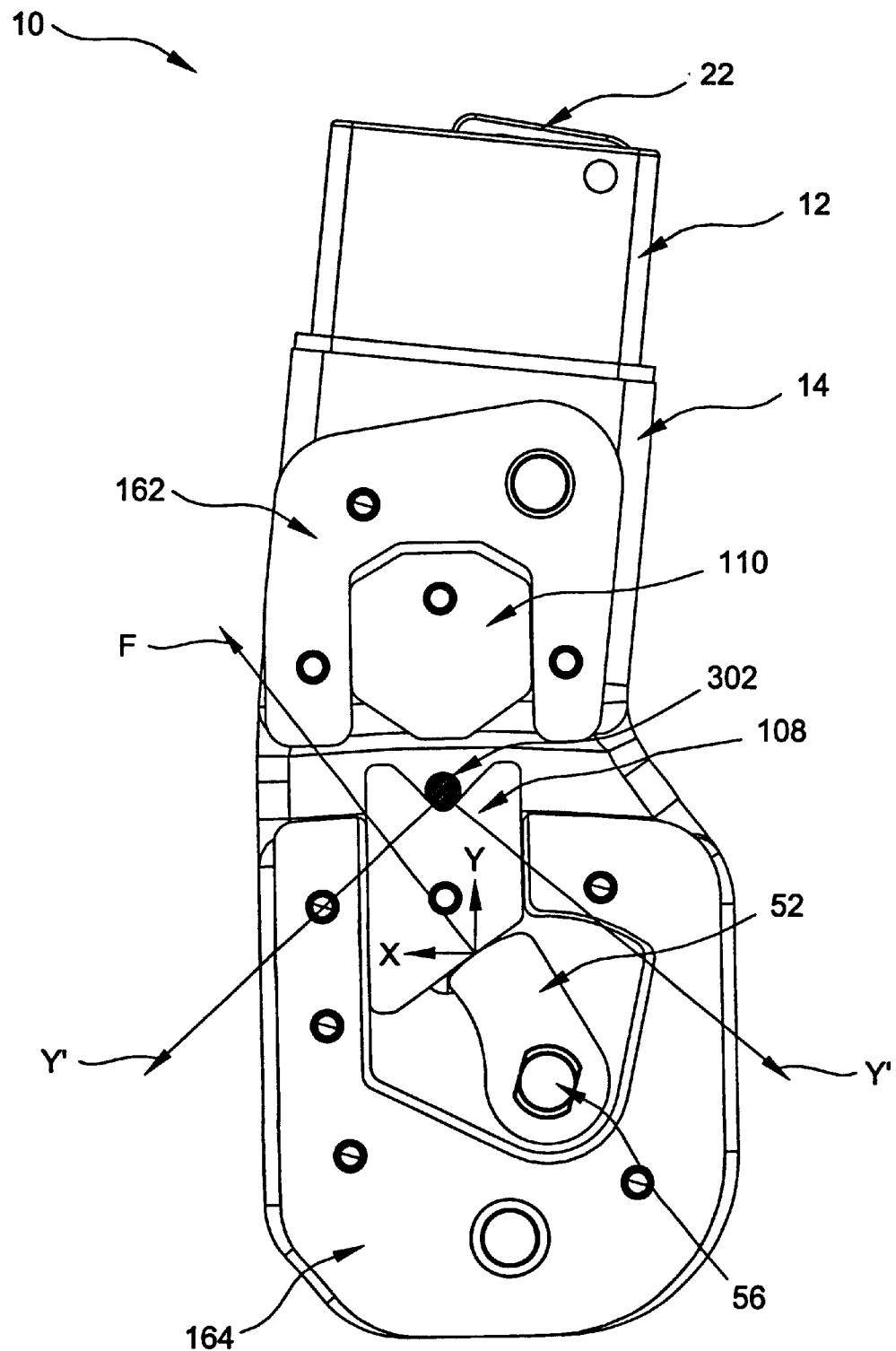
FIG. 14 is a side view of the latch mechanism in a latched position to show the applied forces on a striker.

To achieve almost zero free play between the claw 108 and the striker 302 when the latch mechanism 10 is in the latched position a primary force F is applied through the cam plate 52 to the claw 108 to ensure that the claw 108 is held in frictional engagement with a striker 302. As best seen in FIG. 14, the primary force F is exerted through the engagement of the cam plate 52 and the claw 108. Specifically, engagement face 62 of the cam plate 52 engages the first engagement face 118 of the claw 108 and transmits a force generally normal to the engagement face 118. The primary force F works against the bias of spring 114 to urge the claw 108 in the second direction and into engagement with the striker 302. As such, the striker is 302 is held in frictional contact with engagement face 122 of the claw 108 and prevents relative movement therebetween. Accordingly, any free-play (causing the aforementioned seatback chucking) associated with the interface of the striker 302 and the claw 108 is eliminated.

With continued reference to FIG. 14, the primary force F is generally applied at an angle relative to the longitudinal axis of the claw 108 and as such includes two component forces X,Y. Component force Y transmits a force generally along the longitudinal axis of the claw 108 and acts on the striker 302 once the striker 302 is received into the recess 120. The contact of the engagement faces 122 with the striker 302, combined with the shape of the recess 120, allow reaction forces Y' to securely hold the striker 302 in frictional engagement with the claw 108 as shown in FIG. 14. Reaction forces Y' subsequently eliminate chucking between the claw 108 and the striker 302. While the recess 120 is a generally V-shaped notch, it should be understood that any shape having at least one point of contact with a striker 302, thus creating a similar Y' reaction force acting on a striker 302, is anticipated and should be considered within the scope of the invention.

Figure 13:
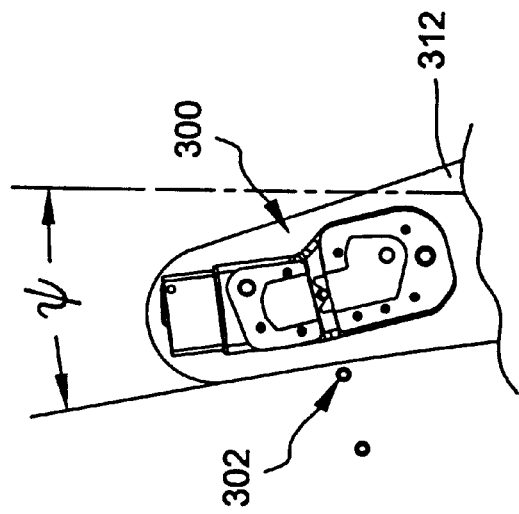
FIG. 13 is a schematic view of the latch mechanism in a third latched position and a seat assembly in a third position.
Figure 12:
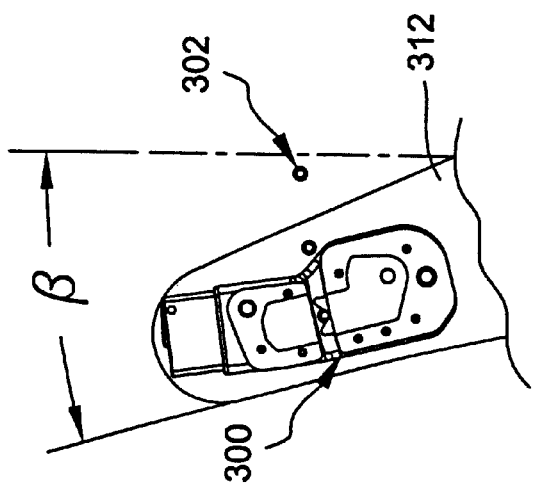
FIG. 12 is a schematic view of the latch mechanism in a second latched position and a seat assembly in a second position.
Figure 11:
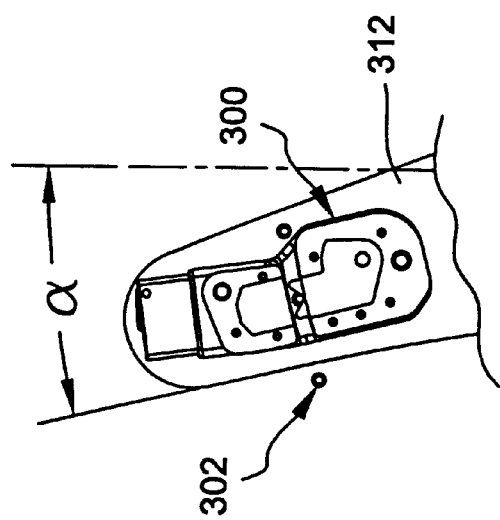
FIG. 11 is a schematic view of the latch mechanism in a first latched position and a seat assembly in a first position.

As best seen in FIGS. 11–13, each one of the plurality of strikers 302 locks the seatback 312 in a different relative angular position $\alpha$, $\beta$, $\psi$, relative to the seat bottom 308. While the present invention provides three adjustment positions, it should be noted that more or fewer adjustment positions are anticipated and should be considered within the scope of the present invention.

When the seatback 312 is initially returned to its upright position from a fold-forward position, the seatback 312 will default to the forward or first position as indicated in FIG. 13 and latch to the forward most striker 302. In doing so, the seatback 312 is latched in a relationship such that the cargo area behind the seatback 312 is maximized and the relative angle between the seatback 312 and the seat bottom is minimized as shown by $\psi$ in FIG. 13.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat latch mechanism, comprising:
    an upper housing;
    a lower housing providing clearance for a striker to pass therethrough;
    a latch assembly including a claw and a push-plate slidably supported by said lower housing, said latch assembly operable between a latched position and an unlatched position; and
    an actuation assembly operably supported by said upper and lower housings and in operable communication with said latch assembly to selectively unlatch said latch assembly, said latch assembly allowing said striker to pass through said lower housing when said latch assembly is in said unlatched position and securely latching said striker between said claw and said push-plate when said latch assembly is in said latched position.

2. The seat latch mechanism of claim 1, wherein said latch assembly further includes a cam plate.

3. The seat latch mechanism of claim 2, wherein said cam plate is biased to lock said claw in said latched position by a first biasing member.

4. The seat latch mechanism of claim 3, wherein said first biasing member is a spring.

5. The seat latch mechanism of claim 2, wherein said cam plate applies a primary force to said claw in said latched position, said primary force having a first force component generally normal to a longitudinal axis of said claw and a second force component laterally across said claw.

6. The seat latch mechanism of claim 5, wherein said primary force causes said striker to frictionally engage said claw.

7. The seat latch mechanism of claim 5, wherein said striker applies a reaction force on said claw due to said primary force.

8. The seat latch mechanism of claim 1, wherein said claw and said push-plate are in operable communication with one another.

9. The seat latch mechanism of claim 1, wherein said claw is biased towards said unlatched position by a second biasing member.

10. The seat latch mechanism of claim 9, wherein said second biasing member is a spring.

11. The seat latch mechanism of claim 1, wherein said actuation assembly is comprised of an actuation member operable between a first and second position and a first and second link.

12. The seat latch mechanism of claim 11, wherein said first link is in operable communication with said actuation member and said second link to selectively unlatch said latch assembly.

13. The seat latch mechanism of claim 12, wherein said actuation member is biased towards said first position by a third biasing member.

14. The seat latch mechanism of claim 13, wherein said third biasing member is a spring.

15. A seat latch mechanism, comprising:
an upper housing;
a lower housing providing clearance for a striker to pass therethrough;
a latch assembly including a claw, a cam plate, and a push-plate slidably supported by said lower housing, said latch assembly operable between a latched position and an unlatched position, said cam plate applying a primary force to said claw in said latched position, said primary force having a first force component generally normal to a longitudinal axis of said claw and a second force component laterally across said claw;
an actuation assembly operably supported by said upper and lower housings and in operable communication with said latch assembly to selectively unlatch said latch assembly, said latch assembly allowing said striker to pass through said lower housing when said latch assembly is in said unlatched position.

16. The seat latch mechanism of claim 15, wherein said primary force causes said striker to frictionally engage said claw.

17. The seat latch mechanism of claim 15, wherein said striker applies a reaction force on said claw due to said primary force.

18. The seat latch mechanism of claim 15, wherein said claw and said push-plate are in operable communication with one another.

19. The seat latch mechanism of claim 15, wherein said cam plate is biased to lock said claw in said latched position by a first biasing member.

20. The seat latch mechanism of claim 19, wherein said first biasing member is a spring.

21. The seat latch mechanism of claim 15, wherein said claw is biased towards said unlatched position by a second biasing member.

22. The seat latch mechanism of claim 21, wherein said second biasing member is a spring.

23. The seat latch mechanism of claim 15, wherein said actuation assembly is comprised of an actuation member operable between a first and second position and a first and second link.

24. The seat latch mechanism of claim 23, wherein said first link is in operable communication with said actuation member and said second link to selectively unlatch said latch assembly.

25. The seat latch mechanism of claim 24, wherein said actuation member is biased towards said first position by a third biasing member.

26. The seat latch mechanism of claim 25, wherein said third biasing member is a spring.

27. A seat assembly selectively attachable to a plurality of strikers, comprising:
a seat bottom;
a seatback pivotally supported by said seat bottom; and
a seat latch mechanism selectively engaging said plurality of strikers, said seat latch mechanism including:
an upper housing;
a lower housing providing clearance for a striker to pass therethrough;
a latch assembly including a claw and a push-plate slidably supported by said lower housing, said latch assembly operable between a latched position and an unlatched position; and
an actuation assembly operably supported by said upper and lower housings and in operable communication with said latch assembly to selectively unlatch said latch assembly, said latch assembly allowing said striker to pass through said lower housing when said latch assembly is in said unlatched position and securely latching said striker between said claw and said push-plate when said latch assembly is in said latched position.

28. The seat latch mechanism of claim 27, wherein said latch assembly further includes a cam plate.

29. The seat latch mechanism of claim 28, wherein said cam plate is biased to lock said claw in said latched position by a first biasing member.

30. The seat latch mechanism of claim 29, wherein said first biasing member is a spring.

31. The seat latch mechanism of claim 28, wherein said cam plate applies a primary force to said claw in said latched position, said primary force having a first force component generally normal to a longitudinal axis of said claw and a second force component laterally across said claw.

32. The seat latch mechanism of claim 31, wherein said primary force causes said striker to frictionally engage said claw.

33. The seat latch mechanism of claim 31, wherein said striker applies a reaction force on said claw due to said primary force.

34. The seat latch mechanism of claim 27, wherein said claw and said push-plate are in operable communication with one another.

35. The seat latch mechanism of claim 27, wherein said claw is biased towards said unlatched position by a second biasing member.

36. The seat latch mechanism of claim 35, wherein said second biasing member is a spring.

37. The seat latch mechanism of claim 27, wherein said actuation assembly is comprised of an actuation member operable between a first and second position and a first and second link.

38. The seat latch mechanism of claim 37, wherein said first link is in operable communication with said actuation member and said second link to selectively unlatch said latch assembly.

39. The seat latch mechanism of claim 38, wherein said actuation member is biased towards said first position by a third biasing member.

40. The seat latch mechanism of claim 39, wherein said third biasing member is a spring.

41. The method of selectively fixing a seatback to a vehicle structure, wherein said vehicle structure has a plurality of strikers fixedly attached thereto disposed in a radial relationship for engagement with said seatback, and wherein said seatback includes a seat latch mechanism for mating engagement with each of said plurality of strikers, the method comprising the steps of:

provided said seat latch mechanism with an upper housing and a lower housing providing clearance for said plurality of strikers to pass therethrough when said latch mechanism is in an unlatched position;

providing a latch assembly operable between a latched position and an unlatched position, and an actuation assembly coaxially aligned with said latch assembly and in operable communication with said latch assembly to selectively unlatch said latch mechanism;

providing a plurality of strikers fixedly attached to a vehicle structure for engagement with said seat latch mechanism;

positioning said seatback such that said latch mechanism contacts one of said plurality of strikers thereby latching said seat latch mechanism to one of said plurality of strikers;

actuating said actuation assembly thereby unlatching said latch assembly and allowing said one of said plurality of strikers to pass through said lower housing whereby said seat latch mechanism is now free to latch to another of said plurality of strikers; and providing said latch assembly with a push-plate for receiving said one of said plurality of strikers to selectively latch said latch assembly.

42. The method of claim 41, further comprising providing said plurality of strikers in a radial relationship.

* * * * *